United States Patent
Zhang et al.

(10) Patent No.: US 11,686,326 B2
(45) Date of Patent: Jun. 27, 2023

(54) CEILING FAN AND MOUNTING BASE OF CEILING FAN

(71) Applicant: FOSHAN CARRO ELECTRICAL CO., LTD., Foshan (CN)

(72) Inventors: Jian-Sheng Zhang, Foshan (CN); Ru-Hui Huang, Foshan (CN); Zhi-Qiang Yuan, Foshan (CN)

(73) Assignee: Foshan Carro Electrical Co., Ltd., Foshan (CN)

( * ) Notice: Subject to any disclaimer, the term of this patent is extended or adjusted under 35 U.S.C. 154(b) by 0 days.

(21) Appl. No.: 17/654,653

(22) Filed: Mar. 14, 2022

(65) Prior Publication Data

US 2022/0316499 A1 Oct. 6, 2022

(30) Foreign Application Priority Data

Apr. 2, 2021 (CN) .......................... 202120688353.0

(51) Int. Cl.
*F04D 29/64* (2006.01)
*F16M 13/02* (2006.01)
*F04D 19/00* (2006.01)
*F04D 25/08* (2006.01)
*F04D 29/60* (2006.01)

(52) U.S. Cl.
CPC ......... *F04D 29/644* (2013.01); *F04D 19/002* (2013.01); *F04D 25/088* (2013.01); *F04D 29/601* (2013.01); *F16M 13/027* (2013.01)

(58) Field of Classification Search
CPC .... F04D 29/644; F04D 19/002; F04D 25/088; F04D 29/601; F16M 13/027
See application file for complete search history.

(56) References Cited

U.S. PATENT DOCUMENTS

| | | | | |
|---|---|---|---|---|
| 2,907,545 A | * | 10/1959 | Beck | F21V 21/26 362/404 |
| 6,146,191 A | * | 11/2000 | Kerr, Jr | H02G 3/123 439/537 |
| 8,353,675 B2 | * | 1/2013 | Lin | F04D 25/088 416/244 R |
| 10,590,960 B2 | * | 3/2020 | Beaman | F04D 29/601 |
| 10,890,191 B2 | * | 1/2021 | Broughman | F16M 13/027 |
| 2006/0263224 A1 | * | 11/2006 | Wang | F04D 25/088 416/244 R |
| 2009/0090837 A1 | * | 4/2009 | Chen | F16M 13/022 248/560 |
| 2015/0090858 A1 | * | 4/2015 | Broughman | F04D 29/601 248/674 |
| 2020/0362878 A1 | * | 11/2020 | Li | F04D 19/002 |

* cited by examiner

*Primary Examiner* — Hung Q Nguyen
*Assistant Examiner* — Susan E Scharpf
(74) *Attorney, Agent, or Firm* — Rosenberg, Klein & Lee

(57) ABSTRACT

A mounting base of a ceiling fan has a mounting disc, a fitting sleeve, and a positioning unit. The mounting disc has a through hole. The fitting sleeve is mounted in the through hole and has a hanging block located on an end of the fitting sleeve. The fitting sleeve is hung on the mounting disc via the hanging block. An accommodating space is formed through the fitting sleeve and is adapted to accommodate a hanging rod. The positioning unit is mounted in the accommodating space and is capable of engaging with the hanging rod. The positioning unit has a bending edge. The positioning unit is hung on the fitting sleeve via the bending edge. The mounting base has a simplified assembling process and a great stability in mounting structure.

13 Claims, 8 Drawing Sheets

CEILING FAN AND MOUNTING BASE OF CEILING FAN

BACKGROUND OF THE INVENTION

1. Field of the Invention

The present invention relates to a ceiling fan, especially to a ceiling fan and a mounting base of the ceiling fan.

2. Description of the Prior Arts

A ceiling fan is an electric fan that is mounted on the ceiling via a mounting base. When the fan blades of the ceiling fan rotate, the surrounding air is driven and a wide range of rotating airflow will be generated. Therefore, the human body feels the more uniform air volume under the ceiling fan, which is more comfortable.

However, the structure of a conventional ceiling fan is complicated, such that the assembling process of the conventional ceiling is cumbersome. Additionally, cyclic vibration will be generated during operating of the ceiling fan, which impacts the structure and the connection between the components of the mounting base, such that some parts might be damaged and even detached, thereby leading to poor stability of the whole mounting structure for the ceiling fan.

To overcome the shortcomings, the present invention provides a ceiling fan and a mounting base of the ceiling fan to mitigate or obviate the aforementioned problems.

SUMMARY OF THE INVENTION

The main objective of the present invention is to provide a ceiling fan and a mounting base of the ceiling fan that have a simple assembling process and a great stability in mounting structure.

The mounting base has a mounting disc, a fitting sleeve, and at least one positioning unit. The mounting disc has a through hole. The fitting sleeve is mounted in the through hole and has an accommodating space and at least one hanging block. The accommodating space is formed inside the fitting sleeve, forms two end openings on the fitting sleeve, and is adapted to accommodate a hanging rod of the ceiling fan. The at least one hanging block is located on an end of the fitting sleeve. The fitting sleeve is hung on the mounting disc via the at least one hanging block. The at least one positioning unit is mounted in the accommodating space, is adapted to be located between the hanging rod and the fitting sleeve, and is capable of engaging with the hanging rod to prevent the hanging rod from moving along an axial direction of the hanging rod relative to the at least one positioning unit. Each of the at least one positioning unit has a bending edge. Each positioning unit is hung on said end of the fitting sleeve that has the at least one hanging block via the bending edge.

In the abovementioned mounting base of the ceiling fan, the mounting disc has the through hole, the fitting sleeve has the accommodating space formed inside and forming the two end openings, and an end of the fitting sleeve has the hanging block. When the fitting sleeve is mounted through the through hole and hung on the mounting disc via the hanging block, the positioning between the fitting sleeve and the mounting disc is accomplished.

In addition, an end of the positioning unit has the bending edge. When the positioning unit is mounted in the accommodating space, the bending edge is hung on an end of the fitting sleeve that forms the hanging block to prevent the positioning unit from falling axially downward with respect to the fitting sleeve along the axial direction of the hanging rod.

When the hanging rod is mounted in the accommodating space of the fitting sleeve, the positioning unit and the hanging rod are engaged with each other via protrusion and concavity. On the other hand, the positioning unit is clamped between the hanging rod and the fitting sleeve to ensure the stability of the engagement between the hanging rod and the positioning unit, and to achieve the positioning between the hanging rod and the positioning unit in the axial direction of the hanging rod. Thus, the stable connection between the hanging rod and the fitting sleeve can be achieved via the positioning unit, thereby achieving the stable connection between the hanging rod and the mounting disc.

In the abovementioned mounting base of the ceiling fan, the positioning unit, the fitting sleeve, and the mounting disc are assembled via engaging with each other by their own structure instead of by another fixing unit. Therefore, the assembling process can be simplified to reduce the work of operators, and the easy assembly and the stable connection can be both achieved.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
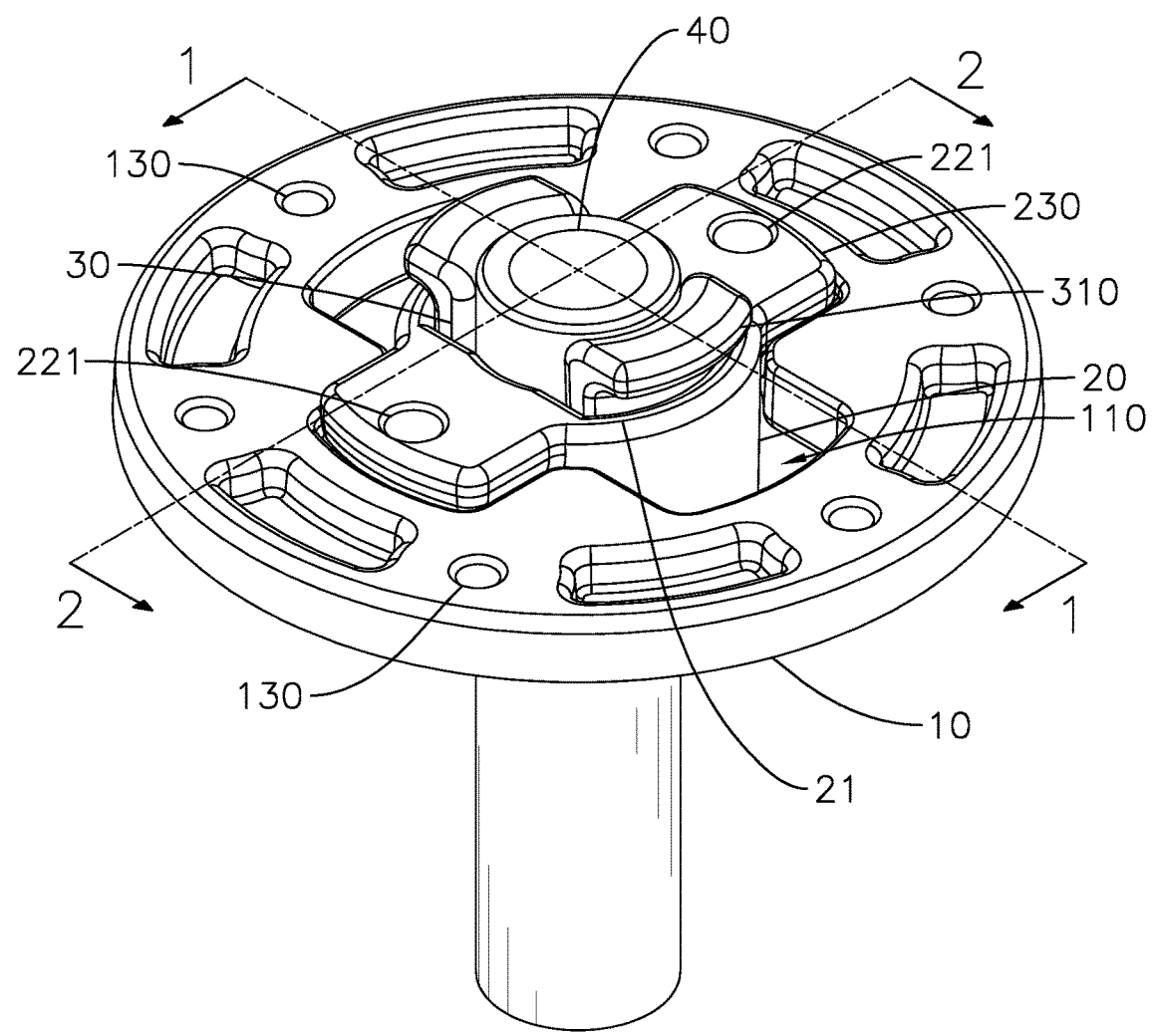
FIG. 1 is a perspective view of a mounting base of the ceiling fan in accordance with the present invention.
Figure 2:
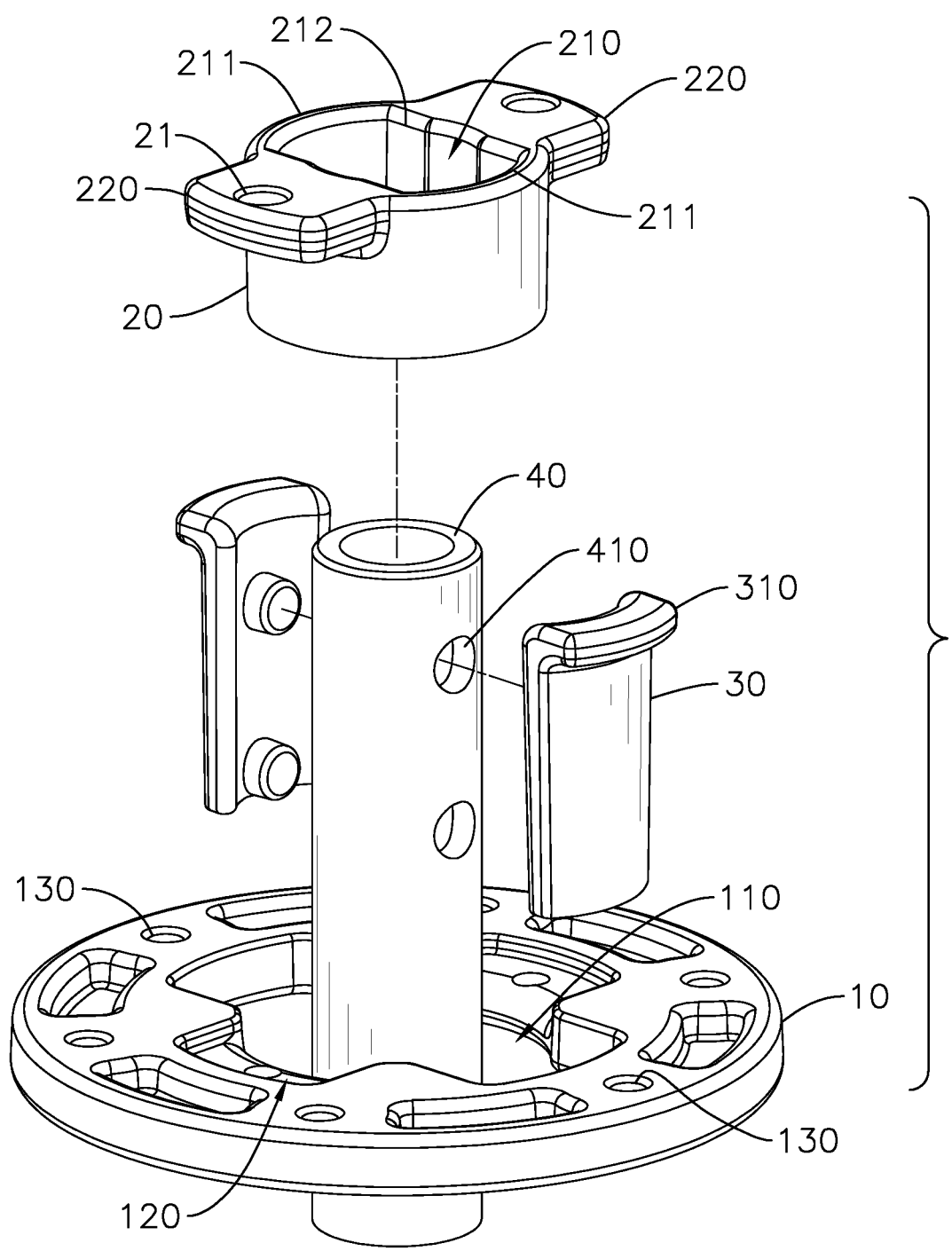
FIG. 2 is an exploded view of the mounting base of the ceiling fan in FIG. 1.

With reference to FIGS. 1 and 2, a mounting base in accordance with the present invention comprises a mounting disc 10, a fitting sleeve 20, and at least one positioning unit 30.

The mounting disc 10 has a through hole 110.

The fitting sleeve 20 has an accommodating space 210 formed inside the fitting sleeve 20 and forming two end openings on the fitting sleeve 20. At least one hanging block 220 is located on an end of the fitting sleeve 20. The fitting sleeve 20 is mounted in the through hole 110 and is hung on the mounting disc 10 via the at least one hanging block 220.

Each of the at least one positioning unit 30 has a bending edge 310. The positioning unit 30 is mounted in the accommodating space 210 and is hung on said end of the fitting sleeve 20 that has the at least one hanging block 220 via the bending edge 310. The accommodating space 210 is adapted to accommodate a hanging rod 40. Each of the at least one positioning unit 30 is located between the hanging rod 40 and the fitting sleeve 20. Each of the at least one positioning unit 30 is capable of engaging with the hanging rod 40 via protrusion and concavity to prevent the hanging rod 40 from moving along an axial direction of the hanging rod 40 relative to the positioning unit 30.

In the abovementioned mounting base of the ceiling fan, the mounting disc 10 has the through hole 110, the fitting sleeve 20 has the accommodating space 210 formed inside and forming the two end openings, and an end of the fitting sleeve 20 has the hanging block 220. When the fitting sleeve 20 is mounted through the through hole 110 and hung on the mounting disc 10 via the hanging block 220, the positioning between the fitting sleeve 20 and the mounting disc 10 is accomplished.

In addition, an end of each of the at least one positioning unit 30 has the bending edge 310. When the positioning unit 30 is mounted in the accommodating space 210, the positioning unit 30 is hung on an end of the fitting sleeve 20 that forms the hanging block 220 via the bending edge 310 to prevent the positioning unit 30 from falling axially downward with respect to the fitting sleeve 20 along the axial direction of the hanging rod 40.

When the hanging rod 40 is mounted in the accommodating space 210 of the fitting sleeve 20, the positioning unit 30 and the hanging rod 40 are engaged with each other via protrusion and concavity. On the other hand, the positioning unit 30 is clamped between the hanging rod 40 and the fitting sleeve 20 to ensure the stability of the engagement between the hanging rod 40 and the positioning unit 30, and to achieve the positioning between the hanging rod 40 and the positioning unit 30 in the axial direction of the hanging rod 40. Thus, the stable connection between the hanging rod 40 and the fitting sleeve 20 can be achieved via the positioning unit 30, thereby achieving the stable connection between the hanging rod 40 and the mounting disc 10.

In the abovementioned mounting base of the ceiling fan, the positioning unit 30, the fitting sleeve 20, and the mounting disc 10 are assembled via engaging with each other by their own structure instead of by another fixing unit. Therefore, the assembling process can be simplified to reduce the work of operators, and the easy assembly and the stable connection can be both achieved.

Figure 3:
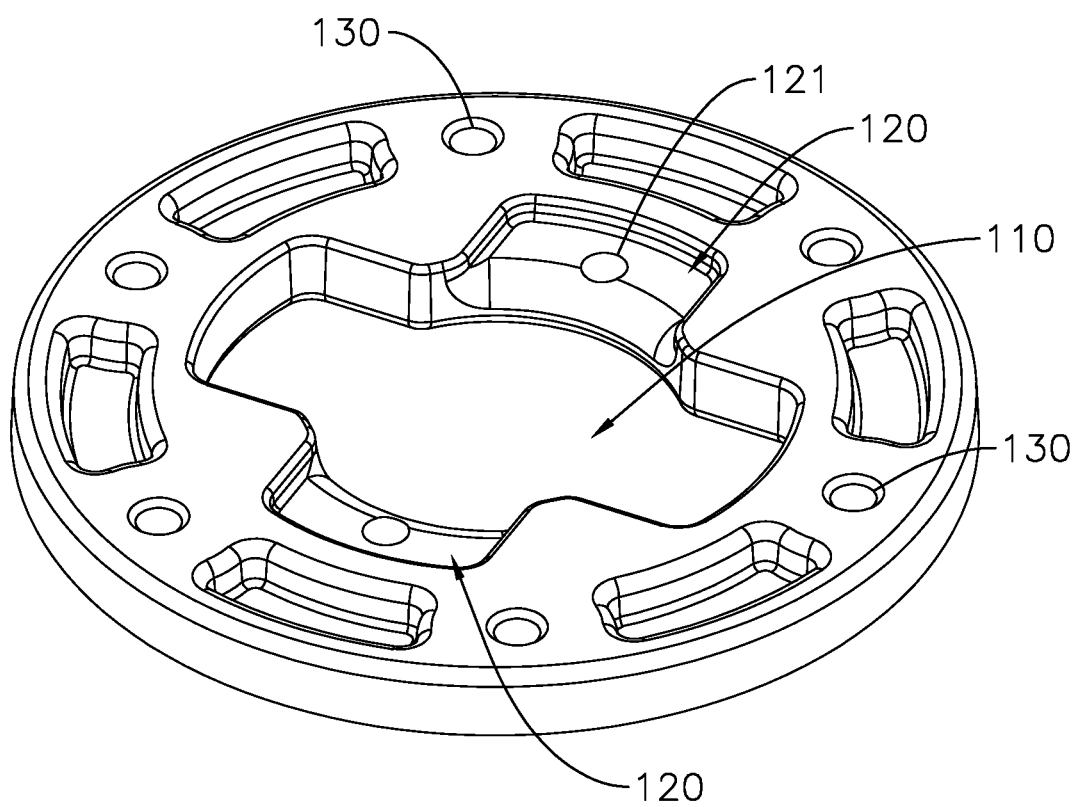
FIG. 3 is a perspective view of the mounting base of the ceiling fan in FIG. 1, showing the mounting disc.

With reference to FIGS. 1 to 3, in order to prevent the fitting sleeve 20 from rotation when the assembling sleeve 20 mounted in the through hole 110 and the hanging block 220 only abuts a surface of the mounting disc 10, based on the abovementioned structure, in this embodiment, the mounting disc 10 has at least one rotation limiting groove 120. The rotation limiting groove 120 communicates with the through hole 110. The hanging block 220 is inserted in the rotation limiting groove 120 to prevent the fitting sleeve 20 from rotation, thereby enhancing stability of connection of the fitting sleeve 20.

Specifically, size and shape of the rotation limiting groove 120 match size and shape of the hanging block 220.

In order to increase stability of connection of the fitting sleeve 20, the hanging block 220 is formed integrally on the end of the fitting sleeve 20. For example, the hanging block 220 can be formed by, but not limited to, stamping, injection molding or forging on the end of the fitting sleeve 20. Forming the hanging block 220 integrally on the fitting sleeve 20 effectively simplifies the manufacturing process, saves assembling time, and strengthens structural strength of the fitting sleeve 20 and the hanging block 220, which ensures the stability of the ceiling fan.

With reference to FIGS. 1 to 5, based on the abovementioned basic structure, in this embodiment, each of the rotation limiting grooves 120 has a first connecting hole 121, and each of the hanging blocks 220 has a second connecting hole 221. A fixing unit (not shown in drawings) is mounted through the first connecting hole 121 and the second connecting hole 221 to fix the fitting sleeve 20 on the mounting disc 10, which ensures the stability of connection between the mounting disc 10 and the fitting sleeve 20.

In this embodiment, an amount of the rotation limiting groove 120 is two, and the two rotation limiting grooves are located in two opposite sides in the through hole 110. An amount of the hanging block 220 is two, and the two hanging blocks 220 respectively correspond in position to the two rotation limiting grooves 120. Configuring the hanging blocks 220 in two sides symmetrically increases the connection stability of the fitting sleeve 20 and the mounting disc 10.

With reference to FIGS. 1 to 5, based on the abovementioned basic structure, in this embodiment, at least one protrusion 320 is mounted on a side surface of the positioning unit 30 facing the hanging rod 40. Each of the at least one protrusion 320 is adapted to be mounted in an assembling hole 410 formed on a side surface of the hanging rod 40. When the positioning unit 30 is attached to the outer wall of the hanging rod 40, the protrusion 320 can be mounted in the assembling hole 410, so the protrusion 320 can limit the movement of the hanging rod 40 relative to the positioning unit 30. When the bending edge 310 of the positioning unit 30 is hung on said end of the fitting sleeve 20 that has the hanging block 220, the protrusion 320 can ensure that the hanging rod 40 will not be displaced downward relative to the fitting sleeve 20.

Optionally, in another embodiment, in order to engage the positioning unit 30 and the hanging rod 40, the positioning unit 30 can be implemented with an assembling hole while the outer wall of the hanging rod 40 can be implemented with a protrusion. In this case, mounting the protrusion of the hanging rod 40 in the assembling hole of the positioning unit 30 also achieves the stable connection of the positioning unit 30 and the hanging rod 40.

Figure 6:
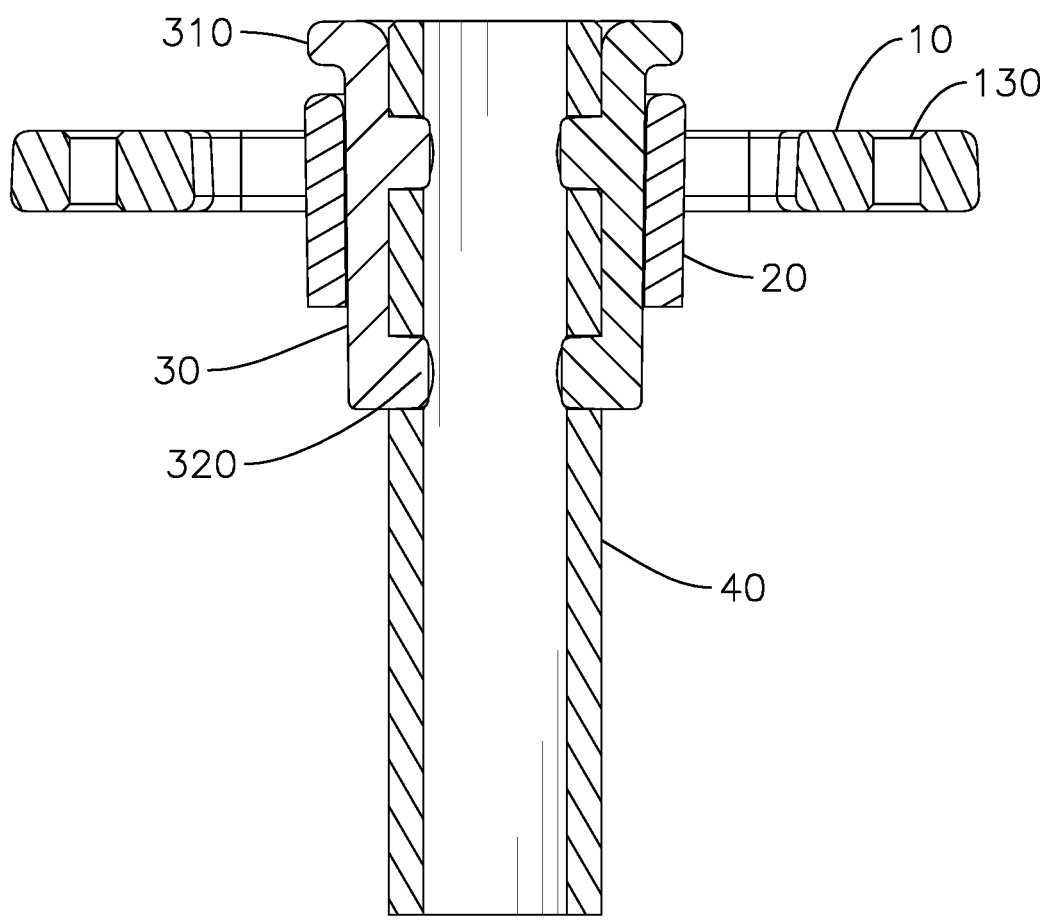
FIG. 6 is a side view in cross-section of the mounting base of the ceiling fan in FIG. 1, shown along the 1-1 cutting line.
Figure 7:
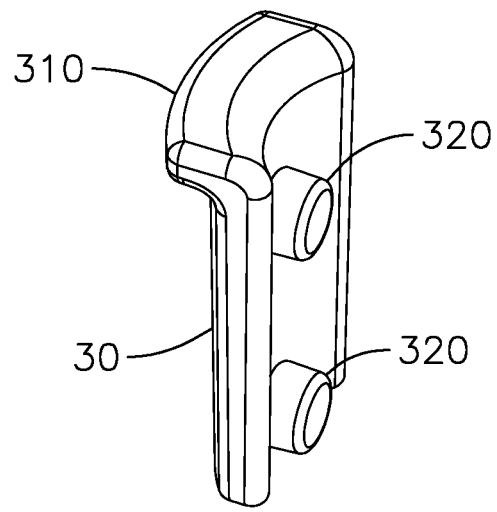
FIG. 7 is a perspective view of the mounting base of the ceiling fan in FIG. 1, showing the positioning unit.
Figure 8:
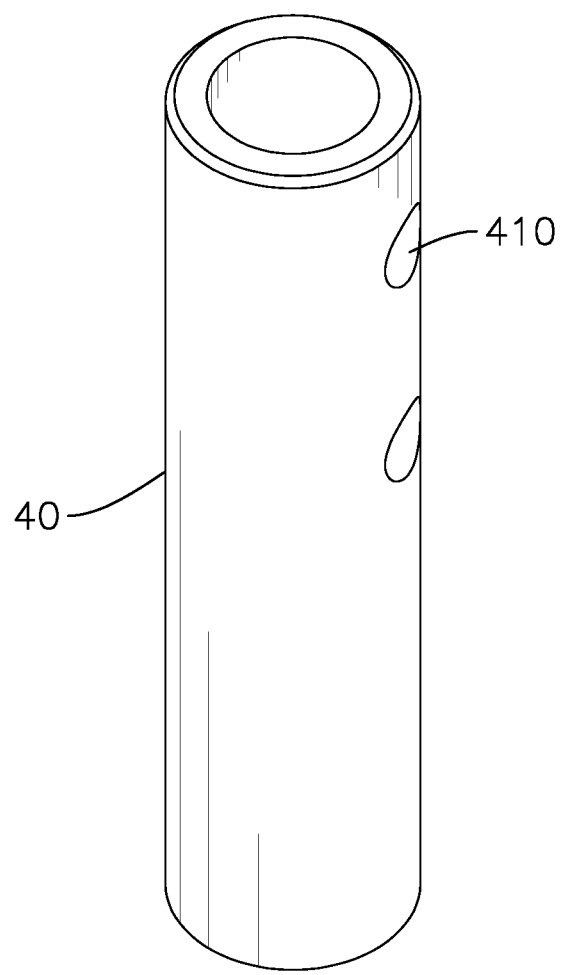
FIG. 8 is a perspective view of the mounting base of the ceiling fan in FIG. 1, showing the hanging rod.

With reference to FIGS. 6 and 7, based on the abovementioned basic structure, in this embodiment, the bending edge 310 is located on an end of the positioning unit 30. An amount of the at least one protrusion 320 is two. The two protrusions 320 are arranged along the axial direction of the hanging rod 40 and are spaced apart from each other to match the assembling hole 410 of the hanging rod 40. But the amount and the configuration of the at least one protrusion 320 are not limited to the abovementioned, as the protrusion 320 can also be arranged along a circumferential direction of the hanging rod 40 on the side surface of the positioning unit 30 facing the hanging rod 40.

In order to enhance the structural strength of the positioning unit 30, simplify the assembling process, and improve the structural stability of the mounting base, the bending edge 310 is formed integrally on the end of the positioning unit 30, and the protrusion 320 is formed integrally on the side surface of the positioning unit 30 facing the hanging rod 40. In other words, by implementing the positioning unit 30 integrally, the structural stability of the positioning unit 30 can be ensured.

With reference to FIG. 7, preferably, each of the protrusions 320 is a round rod, and a diameter of an end of the protrusion 320 away from said positioning unit is smaller than a diameter of another end of the protrusion 320 near said positioning unit. Thus, when the protrusion 320 is mounted in the assembling hole 410, the closer the positioning unit 30 and the hanging rod 40 are, the tighter the protrusion 320 and the assembling hole 410 are, which increases the connection stability of the positioning unit 30 and the hanging rod 40.

With reference to FIGS. 1, 2, and 6, based on the abovementioned basic structure, in this embodiment, an amount of the at least one positioning unit 30 is two. The two positioning units 30 are located in two opposite sides in the accommodating space 210 and abut the fitting sleeve 20. Two portions of an inner wall of the fitting sleeve 20 that abut the two positioning units 30 are two arced walls. In a direction away from the hanging block 220, a distance between the two arced walls gradually decreases, or a wall thickness of each of the positioning units 30 gradually decreases (as shown in FIG. 6). Thus, the two contact surfaces of the positioning unit 30 and the fitting sleeve 20 are inclined to each other so the father the positioning unit 30 moves downward, the tighter the fitting sleeve 20 and the hanging rod 40 clamp the positioning unit 30.

Figure 4:
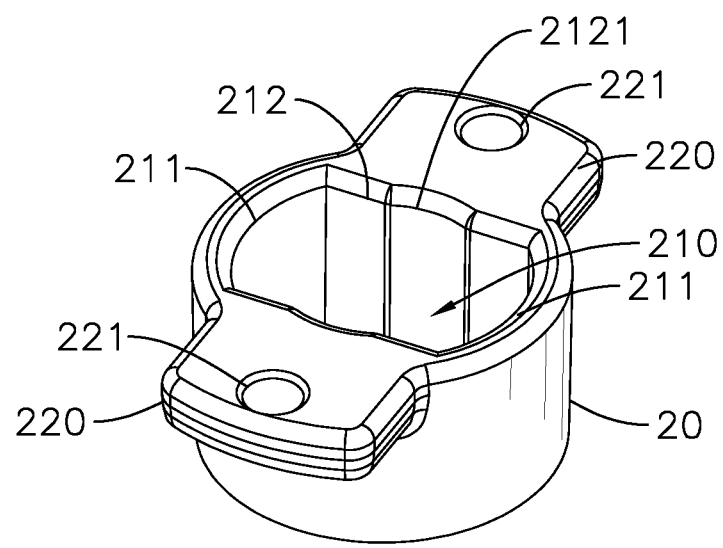
FIG. 4 is a perspective view of the mounting base of the ceiling fan in FIG. 1, showing the fitting sleeve.
Figure 5:
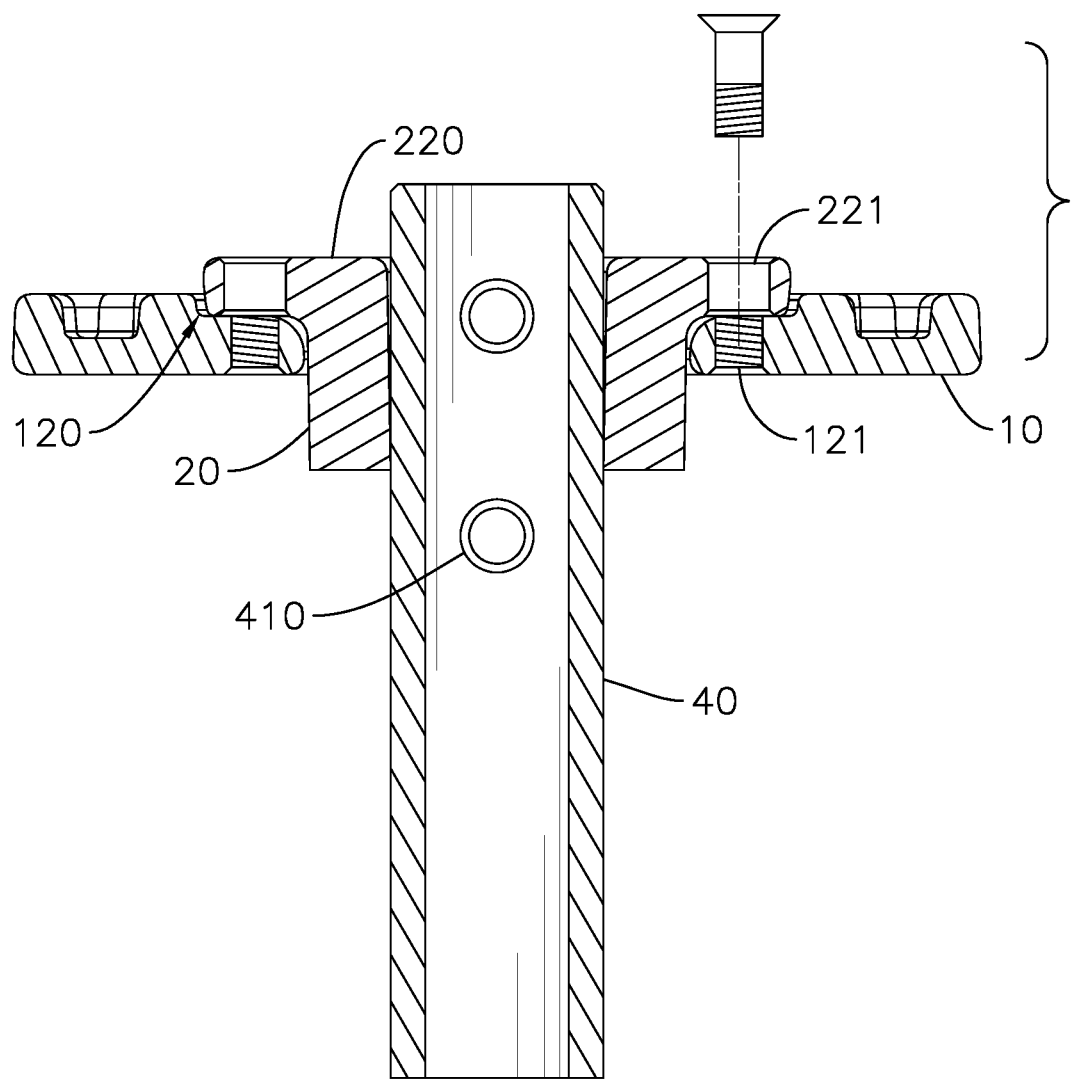
FIG. 5 is a side view in cross-section of the mounting base of the ceiling fan in FIG. 1, shown along the 2-2 cutting line.

With reference to FIGS. 2 and 4, the other portion of the inner wall of the fitting sleeve 20 that does not abut the two positioning units 30 is defined as a supporting wall 212. In order to match the shape of the accommodating space 210 and the hanging rod 40, a portion of the supporting wall 212 that abuts the hanging rod 40 is an arced surface 2121, and therefore the fitting sleeve 20 tightly fits the hanging rod 40.

With reference to FIGS. 1 and 3, based on the abovementioned structure, in this embodiment, the mounting base has multiple fixing units (not shown in drawings). The mounting disc 10 has multiple mounting holes 130 arranged along a circumferential direction of the mounting disc 10 and spaced apart from each other. The fixing units are mounted through the mounting holes 130 to fix the mounting disc 10 on a ceiling. Since a plurality of the mounting holes 130 are provided and the mounting holes 130 are spaced apart, the mounting disc 10 can be stably mounted on the ceiling.

The present invention provides a ceiling fan comprising the hanging rod 40 and the mounting base. The hanging rod 40 is mounted in the accommodating space 210 and engages with the positioning unit 30 via protrusion and concavity. A fan body is mounted on an end of the hanging rod 40. One end of the hanging rod 40 is inserted into the accommodating space 210, the hanging rod 40 realizes the stable connection with the fitting sleeve 20 through the concave and convex cooperation with the positioning unit 30, and finally realizes the stable connection with the mounting disc 10.

The followings are steps for assembling the mounting base and the hanging rod 40. First, mount the fitting sleeve 20 in the through hole 110 of the mounting disc 10, and hang the hanging block 220 on the mounting disc 10. Next, the two positioning units 30 are respectively attached to two side walls of the hanging rod 40, and the positioning unit 30 and the hanging rod 40 engage with each other. Then, insert the hanging rod 40 with the positioning unit 30 into the accommodating space 210 from the end of the fitting sleeve 20 that has the hanging block 220, hang the bending edge 310 of the positioning unit 30 on the end of the fitting sleeve 20 that has the hanging block 220 to mount the positioning unit 30 in the accommodating space 210 of the fitting sleeve 20, and finally the stable connection between the hanging rod 40 and the mounting base is realized.

The hanging rod 40, the positioning unit 30, the fitting sleeve 20, and the mounting disc 10 are assembled by engaging with each other via their own structure instead of fixing by screws, which simplifies the assembling process and reduces the work of operators. A conventional hanging rod and a conventional mounting base are assembled by a fixing unit such as a screw, causing poor connection strength and low stability. Moreover, after a long term use, the fixing unit might be damaged or loosened, which leads to danger.

Specifically, in this embodiment, when the fitting sleeve 20 is inserted in the through hole 110, the hanging block 220 formed on the end of the fitting sleeve 20 is mounted and inserted in the rotation limiting groove 120 of the mounting disc 10 to prevent the fitting sleeve 20 and the mounting disc 10 from rotating relative to each other.

In addition, in order to engage the positioning unit 30 and the hanging rod 40, the protrusion 320 is formed on the side surface of each of the positioning units 30 facing the hanging rod 40, and the assembling hole 410 is formed on the hanging rod 40 and is aligned to the protrusion 320. The protrusion 320 is mounted in the corresponding assembling hole 410 to assemble the positioning unit 30 and the hanging rod 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A mounting base of a ceiling fan, the mounting base comprising:
    a mounting disc having
        a through hole;
    a fitting sleeve mounted in the through hole and having
        an accommodating space formed inside the fitting sleeve, forming two end openings on the fitting sleeve, and adapted to accommodate a hanging rod of the ceiling fan; and
        at least one hanging block located on an end of the fitting sleeve; the fitting sleeve hung on the mounting disc via the at least one hanging block; and
    at least one positioning unit mounted in the accommodating space, adapted to be located between the hanging rod and the fitting sleeve, and capable of engaging with the hanging rod to prevent the hanging rod from moving along an axial direction of the hanging rod relative to the at least one positioning unit; each of the at least one positioning unit having
        a bending edge; the positioning unit hung on the end of the fitting sleeve that has the at least one hanging block via the bending edge;
    wherein
    each of the at least one positioning unit has at least one protrusion formed on a side surface of the positioning unit that faces the hanging rod; each of the at least one protrusion adapted to be mounted in an assembling hole formed on a side surface of the hanging rod.

2. The mounting base as claimed in claim 1, wherein the mounting disc has
    at least one rotation limiting groove communicating with the through hole; and
    the at least one hanging block is inserted in the at least one rotation limiting groove.

3. The mounting base as claimed in claim 2, wherein an amount of the at least one rotation limiting groove is two; the two rotation limiting grooves are located in two opposite sides of the through hole; and an amount of the at least one hanging block is two; the two hanging blocks correspond in position respectively to the two rotation limiting grooves.

4. The mounting base as claimed in claim 3, wherein
each of the two rotation limiting grooves forms a first connecting hole;
each of the two hanging blocks forms a second connecting hole; and
the first connecting hole and the second connecting hole are adapted to be mounted through by a fixing unit to fix the fitting sleeve on the mounting disc.

5. The mounting base as claimed in claim 4, wherein
the bending edge is located on an end of the positioning unit;
an amount of the at least one protrusion is two; the two protrusions are arranged along the axial direction of the hanging rod and are spaced apart from each other to match the assembling hole of the hanging rod.

6. The mounting base as claimed in claim 5, wherein
each of the two protrusions is a round rod; and
a diameter of an end of each of the protrusions away from the positioning unit is smaller than a diameter of another end of the protrusion near the positioning unit.

7. The mounting base as claimed in claim 6, wherein
an amount of the at least one positioning unit is two;
the two positioning units are located in two opposite sides in the accommodating space and abut the fitting sleeve;
two portions of an inner wall of the fitting sleeve that abut the two positioning units are two arced walls; and
in a direction away from the hanging block, a distance between the two arced walls gradually decreases, or a wall thickness of each of the positioning units gradually decreases.

8. The mounting base as claimed in claim 7, wherein
the mounting base has
multiple fixing units; and
the mounting disc has
multiple mounting holes arranged along a circumferential direction and spaced apart from each other; the fixing units mounted through the mounting holes to fix the mounting disc on a ceiling.

9. The mounting base as claimed in claim 1, wherein
the bending edge is located on an end of the positioning unit;
an amount of the at least one protrusion is two; the two protrusions are arranged along the axial direction of the hanging rod and are spaced apart from each other to match the assembling hole of the hanging rod.

10. The mounting base as claimed in claim 9, wherein
each of the two protrusions is a round rod; and
a diameter of an end of each of the protrusions away from the positioning unit is smaller than a diameter of another end of the protrusion near the positioning unit.

11. The mounting base as claimed in claim 1, wherein
an amount of the at least one positioning unit is two;
the two positioning units are located in two opposite sides in the accommodating space and abut the fitting sleeve;
two portions of an inner wall of the fitting sleeve that abut the two positioning units are two arced walls; and
in a direction away from the hanging block, a distance between the two arced walls gradually decreases, or a wall thickness of each of the positioning units gradually decreases.

12. The mounting base as claimed in claim 1, wherein
the mounting base has
multiple fixing units; and
the mounting disc has
multiple mounting holes arranged along a circumferential direction and spaced apart from each other; the fixing units mounted through the mounting holes to fix the mounting disc on a ceiling.

13. A ceiling fan comprising:
a mounting base having
a mounting disc having
a through hole;
a fitting sleeve mounted in the through hole and having
an accommodating space formed inside the fitting sleeve and forming two end openings on the fitting sleeve; and
at least one hanging block located on an end of the fitting sleeve; the fitting sleeve hung on the mounting disc via the at least one hanging block; and
at least one positioning unit mounted in the accommodating space; each of the at least one positioning unit having
a bending edge; the positioning unit hung on the end of the fitting sleeve that has the at least one hanging block via the bending edge;
a hanging rod mounted in the accommodating space and engaging with the at least one positioning unit; the at least one positioning unit adapted to be located between the hanging rod and the fitting sleeve, and capable of engaging with the hanging rod to prevent the hanging rod from moving along an axial direction of the hanging rod relative to the at least one positioning unit; and
a fan body mounted on an end of the hanging rod;
wherein
each of the at least one positioning unit has
at least one protrusion formed on a side surface of the positioning unit that faces the hanging rod; each of the at least one protrusion adapted to be mounted in an assembling hole formed on a side surface of the hanging rod.

* * * * *